United States Patent
Agnes et al.

(10) Patent No.: US 6,720,689 B2
(45) Date of Patent: Apr. 13, 2004

(54) BRUSHLESS MOTOR HAVING CAPACITORS MOUNTED ON SIDEWALL OF MOTOR HOUSING

(75) Inventors: Michael Jeffrey Agnes, Bel Air, MD (US); Garrett Patrick McCormick, Baltimore, MD (US); Richard Thomas Walter, Baldwin, MD (US); Christopher Ryan Yahnker, Eldersburg, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/029,197

(22) Filed: Dec. 20, 2001

(65) Prior Publication Data

US 2003/0117028 A1 Jun. 26, 2003

Related U.S. Application Data (63) Continuation-in-part of application No. 10/014,711, filed on Dec. 11, 2001, now Pat. No. 6,570,284.

(51) Int. Cl.$^7$ ............................................... H20K 11/00
(52) U.S. Cl. ........................ 310/71; 310/68 R; 310/43
(58) Field of Search ............................ 310/68 R, 71, 310/43; 361/861

(56) References Cited

U.S. PATENT DOCUMENTS

| | | | |
|---|---|---|---|
| 4,499,523 A | * | 2/1985 | Gillett ........................ 361/383 |
| 4,727,274 A | | 2/1988 | Adam et al. ................. 310/239 |
| 4,963,778 A | | 10/1990 | Jensen et al. .............. 310/68 D |
| 5,117,138 A | | 5/1992 | Trian ............................ 310/89 |
| 5,357,161 A | | 10/1994 | Daniels |
| 5,629,574 A | * | 5/1997 | Cognetti ....................... 310/71 |
| 5,723,924 A | | 3/1998 | Blanchet ....................... 310/85 |
| 5,747,901 A | | 5/1998 | Harada et al. ................. 310/71 |
| 5,892,309 A | | 4/1999 | Dreher ........................ 310/80 |
| 6,133,658 A | | 10/2000 | Fisher et al. .................. 310/89 |
| 6,177,740 B1 | | 1/2001 | Burns ....................... 310/68 R |
| 6,198,183 B1 | | 3/2001 | Baeumel et al. .............. 310/52 |
| 6,215,214 B1 | | 4/2001 | Fisher et al. .................. 310/89 |
| 6,229,236 B1 | | 5/2001 | Fisher et al. .................. 310/89 |

FOREIGN PATENT DOCUMENTS

| | | |
|---|---|---|
| DE | 3735734 | 5/1989 |
| DE | 4418271 | 11/1995 |
| DE | 4444212 | 6/1996 |
| DE | 19637192 | 4/1998 |
| DE | 29809198 U | 9/1998 |

\* cited by examiner

*Primary Examiner*—Nicholas Ponomarenko
*Assistant Examiner*—Iraj A. Mohandesi
(74) *Attorney, Agent, or Firm*—Harness, Dickey & Pierce, P.L.C.

(57) ABSTRACT

An electronically commutated brushless motor including a motor housing, a bulge formed in a sidewall of the motor housing, and a capacitor assembly housed in the bulge. The capacitor assembly includes a capacitor printed circuit board (PCB) having a plurality of longitudinal edges and at least one capacitor mounted on the capacitor PCB. The bulge includes a plurality of channels located along an inside surface of a sidewall of the bulge, in which the longitudinal edges of the capacitor assembly are slideably inserted.

37 Claims, 11 Drawing Sheets

BRUSHLESS MOTOR HAVING CAPACITORS MOUNTED ON SIDEWALL OF MOTOR HOUSING

CROSS REFERENCE TO RELATED APPLICATIONS

This application is a Continuation-In-Part of application U.S. Ser. No. 10/014,711, entitled Brushless Motor Having Double Insulation, now U.S. Pat No. 6,570,284, filed Dec. 11, 2001 in the U.S. Patent and Trademark Office. The contents of the aforementioned Application are incorporated herein by reference, and the benefit of priority to the same Application is claimed under 35 U.S.C. §120.

FIELD OF INVENTION

The invention relates generally to electronically commutated brushless motors, such as switched reluctance motors, high frequency induction motors, brushless AC motors, and brushless DC motors. More particularly, the invention relates to an electronically commutated brushless motor design and assembly process that provides a robust brushless motor capable of meeting the unique functional requirements in various applications, such as portable table saws, miter saws, site saws, and combination saws. Specifically, the invention relates to an electronically commutated brushless motor design having a bulge formed in a sidewall of the motor housing, wherein a capacitor subassembly is housed, thereby providing a electronically commutated brushless motor having a relatively short axial length.

BACKGROUND OF THE INVENTION

Prior art electronically commutated brushless motors suffer from various limitations. One limitation is a restriction of airflow through the motor. In a typical universal motor housing, air is drawn in through vents in an end cap, passes over a brush gear assembly and windings, through a fan and exhausts out the other end of the motor.

In an electronically commutated brushless motor, air is also drawn in through an end cap but first must pass around the periphery of an electronics control module, installed at one axial end of the housing, before the air can pass through the rest of the motor. Thus, the electronics control module, which includes a potting boat holding an encapsulated printed circuit board (PCB), impedes the airflow by causing the air to first pass around the electronics control module. After passing around the electronics control module the air passes down through channels created by extruded fins of aluminum heat sinks, thereby cooling electronic components attached to the heat sinks. The air then continues over stator windings, passes through and around the stator, through a fan and exhausts out through the end of the motor. Thus, in electronically commutated brushless motors the electronics control module restricts the airflow through the motor.

The obstruction to airflow in electronically commutated brushless motors is further compounded by the housing molding process. To effectively mold and produce the housing, it must have draft added on both its internal (core) and external (cavity) sides. Since the geometry at the mouth of the housing is fixed by mounting interface requirements with existing products, the draft closes (i.e., narrows) the housing down about the electronics control module, thereby further restricting the airflow around the electronics control module and through the motor.

A second limitation of known electronically commutated brushless motors is that the motor is typically longer than a typical universal motor. Due to the overall length, electronically commutated brushless motors are difficult to utilize in many power tools where it is desirable to keep the overall axial length of the motor, or housing, as short as possible. This is especially true with saws, such as miter saws and other saws, because when the saw (and the motor coupled to the saw) is tilted at an angle, an extra long motor housing can cause interference with a fence or the table of the saw. For example, in a TGS-type combination saw, the axial length of the motor housing must be short enough so that it does not protrude beyond the frame of the saw. If it does, it will prevent the table from being flipped over.

As another example, the axial length of the motor in a small portable table saw should be short enough such that when attached to the saw gear case, the motor housing should fit inside the skirt that forms the base of the table. As yet another example, in a miter saw, where the bevel and miter functions will require the end of the motor to be tipped towards the table, the axial length of the motor needs to sufficiently short such that the motor will not contact the table fence when it is articulated into a tilted position for a bevel or miter cut.

A third limitation of known electronically commutated brushless motors is the inability to insure proper alignment of the registering means on the rotor shaft with the rotor pole, and the position sensor with the stator during the assembly process. The registering means could be any suitable registering means such as an interrupter or a magnet, and the position sensor could any suitable sensor such as an optical sensor or a Hall Effect sensor. In typical electronically commutated brushless motors, the position of the registering means, relative to the position sensor, determines the position of the rotor, relative to the stator. In electronically commutated brushless motors it is critically important to know the exact position of the rotor when the electronic switching signals, which switch the direction of the flux in the motor winding(s), are provided by an electronic controller. If the alignment of the registering means with the rotor pole is off, or the alignment of the position sensor with the stator is not precisely set, then the position of the registering means, as detected by the position sensor, will provide an inaccurate indication of the position of the rotor, relative to the stator. If the position of the rotor is not accurately determined, the electronic switching motor will very quickly lose power and torque.

A fourth limitation of known electronically commutated brushless motors is meeting the requirements for double insulated construction as described by Underwriters Laboratories (UL) and other compliance agencies. Double insulated motor designs, which eliminate the need for a ground wire in the power cord, have been implemented on universal motors. This is a preferred construction for hand held and table mounted power tools since the alternative, grounded tools, rely on there being a solid ground connection available on a job site, which often is not the case. The basic requirement is that the design must provide at least two levels of insulation between live components, such as the windings, and any metallic components, such as the shaft or screws, that are accessible to the user. Known electronically commutated brushless motors do not implement a double insulated construction design.

Therefore, it would be desirable to provide an electronically commutated brushless motor design that provides increased airflow through the motor. It would further be desirable provide an electronically commutated brushless motor having an overall axial length suitable for applications requiring a shorter motor. Even further, it would be desirable to provide an electronically commutated brushless motor design that insures accurate alignment of the optical encoder with the rotor poles, and accurate alignment of the optical sensor with the stator during assembly of the motor. Further yet, it would be desirable to provide an electronically commutated brushless motor that implements a double insulated design without significantly increasing the cost or complicating the manufacturability and/or assembly of the overall motor.

BRIEF SUMMARY OF THE INVENTION

The present invention relates to an electronically commutated brushless motor design, which overcomes the various drawbacks described above. In a preferred form, the invention relates to brushless AC motor, although it will be appreciated that the invention is also applicable to brushless DC motors.

In one aspect of the present invention a housing of the motor is provided with a draft angle that increases the airflow through the housing to allow more efficiently cooling of the motor.

In a second aspect of the present invention the electronically commutated brushless motor design provides a capacitor mounting arrangement that allows the overall axial length of the motor to be made shorter. The film capacitors associated with the electronic control system for the motor are mounted on an independent circuit board. The circuit board is adapted to slide into a housing protrusion, or bulge, formed on the sidewall of the housing rather than being positioned at one axial end of the housing. This allows the overall axial length of the housing to be made shorter, thereby allowing a wider range of applications for the motor in which the motor must be articulated into different positions without interfering with other components of its associated tool.

In a third aspect of the present invention the electronically commutated brushless motor provides a housing that allows accurate alignment of a stator and a position sensor, such as an optical sensor, relative to each other. This is accomplished by using a housing molding core that produces a housing that includes both a bridge on which the position sensor is mounted, and stator locating ribs. Typically, the molding core for the housing forms locating ribs on an interior surface of the housing, which are used to precisely align the stator when it is inserted into the housing, but does not include a mounting bridge for the position sensor. By molding the housing to include both a position sensor mounting bridge and the stator locating ribs, variances in the positioning of the position sensor, relative to the stator, are avoided. Therefore, the position sensor and the stator will be accurately aligned when installed, without the need for time consuming alignment procedures, or tests, during the assembly of the motor.

In a fourth aspect of the present invention the electronically commutated brushless motor incorporates a double insulation (DI) feature, thereby eliminating the need for a direct ground cable in the power cord. The DI design includes insulating strips between the stator and stator windings, and an insulating sleeve disposed between the rotor shaft and the rotor laminations. Therefore, there are two layers of insulation between metal parts accessible to a user and parts of the motor in which electrical current flows. Alternatively, the motor housing, which supports the stator, is also constructed of a non-conductive material.

BRIEF DESCRIPTION OF THE DRAWINGS

The present invention will become more fully understood from the detailed description and accompanying drawings, wherein.

DETAILED DESCRIPTION OF THE INVENTION

Figure 1:
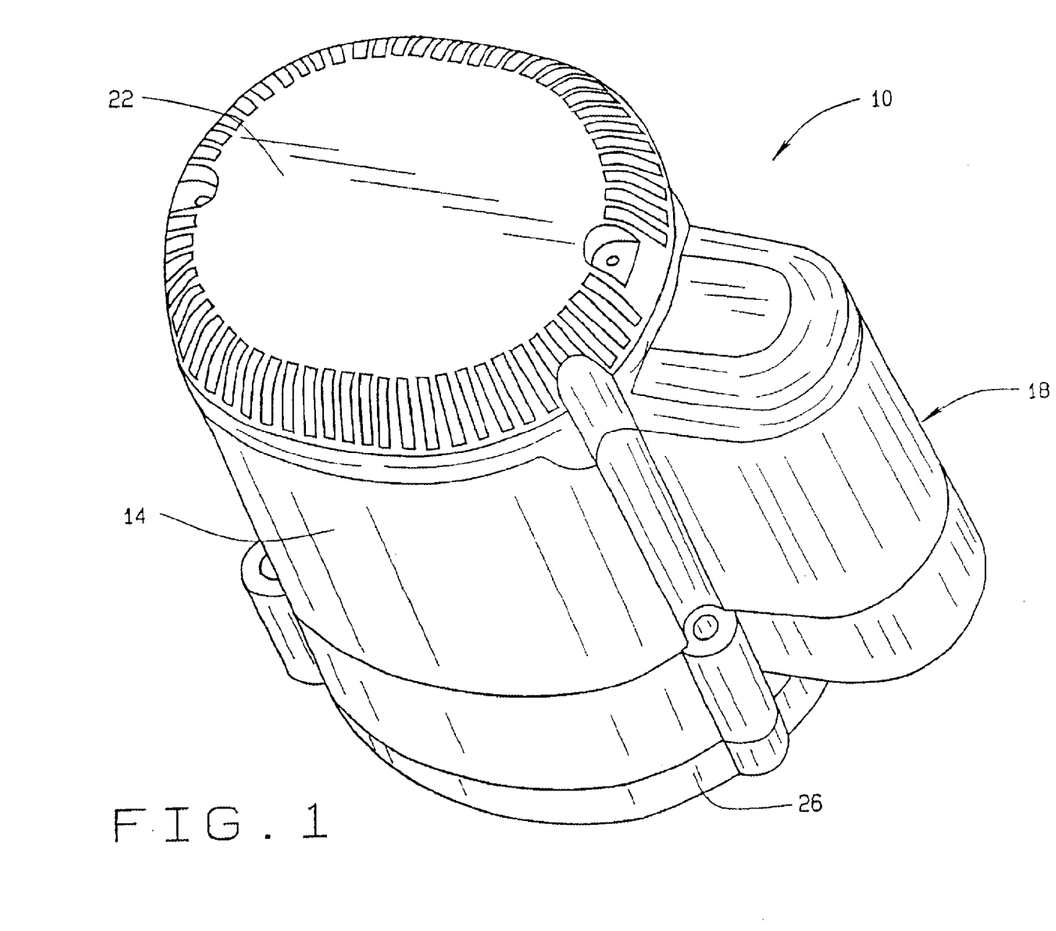
FIG. 1 is a perspective view of a electronically commutated brushless motor in accordance with a preferred embodiment of the present invention.

FIG. 1 is a perspective view of an electronically commutated brushless motor 10 in accordance with a preferred embodiment of the present invention. Motor 10 is a self-contained motor, which can be bolted directly onto a gearbox or other support means of a product, such as a power tool. Motor 10 includes a plastic motor housing 14 having an integrally formed bulge 18 protruding from an outer surface of a sidewall of the motor housing, wherein a plurality of capacitors (not shown) are inserted. Housing 14 is closed at a distal end by a vented end cap 22 and closed at the opposing proximal end by a bearing end cap 26.

Figure 2:
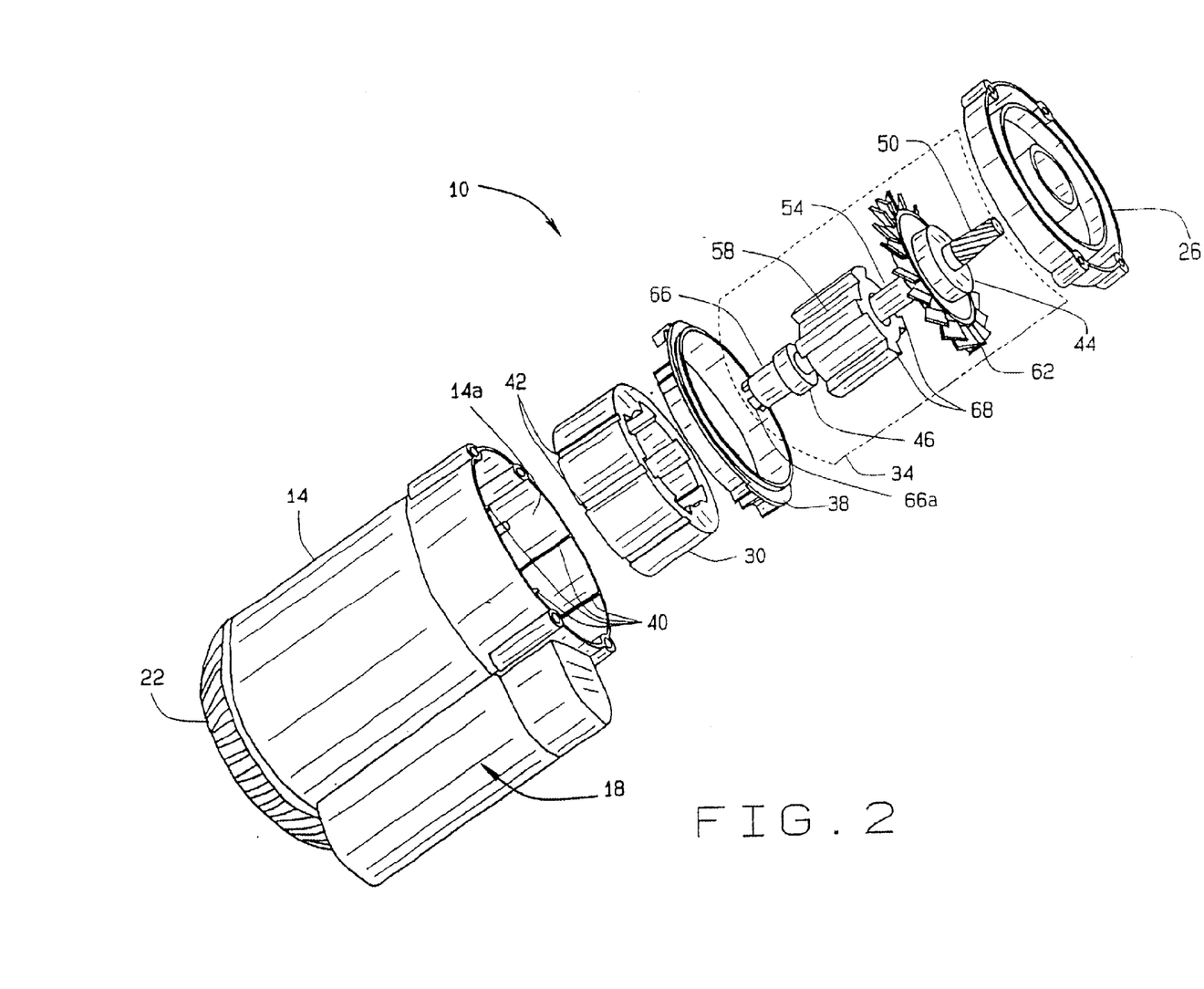
FIG. 2 is an exploded view of the motor shown in FIG. 1, showing how the components of the motor are assembled.

FIG. 2 is an exploded view of motor 10 (shown in FIG. 1) showing how the components of motor 10 are assembled. A stator stack 30, a rotor 34 and a baffle 38 are fitted annularly inside housing 14. Stator stack 30 comprises a stack of steel laminations fitted with stator windings (described in reference to FIG. 8 below). The stator windings are sequentially energized with electric current, thereby generating a revolving magnetic field. Stator stack 30 is precisely positioned within housing 14 using a plurality of locating ribs 40 formed on an inside surface 14a of a sidewall of housing 14. The locating ribs 40 fit into stator channels 42 integrally formed in stator stack 30. Stator stack 30 is then pressed into housing 14, having an interference fit, and secured in place with two screws (not shown).

Rotor 34 has no windings and is supported between a first bearing 44, supported by bearing end cap 26, and a second bearing 46, supported by an integral bearing support (not shown), incorporated into motor housing 14. Rotor 34 includes a shaft 50, an insulating tube, or sleeve, 54, a stack of steel laminations 58, and a cooling fan 62 that helps to direct air through the motor 10. Stack 58 is assembled by interlocking, welding, cleating, or bonding the steel laminations together. Insulating tube 54 is pressed onto shaft 50 and rotor stack 58 is pressed onto insulating tube 54. Shaft 50 connects to a product gearbox (not shown), which in turn is coupled to a tool element such as a saw blade. The revolving magnetic field created by the stator windings imparts a force on rotor stack 58 causing rotor stack 58 to revolve about an axis of shaft 50, thereby transferring torque to shaft 50, which in turn delivers torque to gears in the product gearbox. Rotor stack 58 includes a plurality of four rotor poles 68, although it will be appreciated that a greater or lesser plurality of rotor poles 68 could be incorporated.

Rotor 34 further includes a registering means 66, such as an interrupter. As used herein registering means 66 is referred to as interrupter 66, but it will be appreciated that registering means 66 could be any other suitable registering means, such as a magnet. Interrupter 66 has a plurality of four vanes 66a, only three of which are visible in FIG. 2. Interrupter 66 is a plastic part that fits on the distal, or rear, end of shaft 50 and interfaces with a position sensor (described below in reference to FIG. 3) to provide data relating to a rotor position and a rotor speed to the electronic controller. Slipping or spinning of the outer diameter (OD) of second bearing 46 is prevented by a compliant material (not shown) that fits between the OD of bearing 46 and the wall of the bearing support, for example a rubber plug or rubber boot. After stator 30, baffle 38 and rotor 34 are annularly fitted into housing 14, bearing end plate 26 is fitted over first bearing 44 and onto locating points at the mouth of housing 14, then secured to plastic housing 14 with four screws (not shown).

Figure 3:
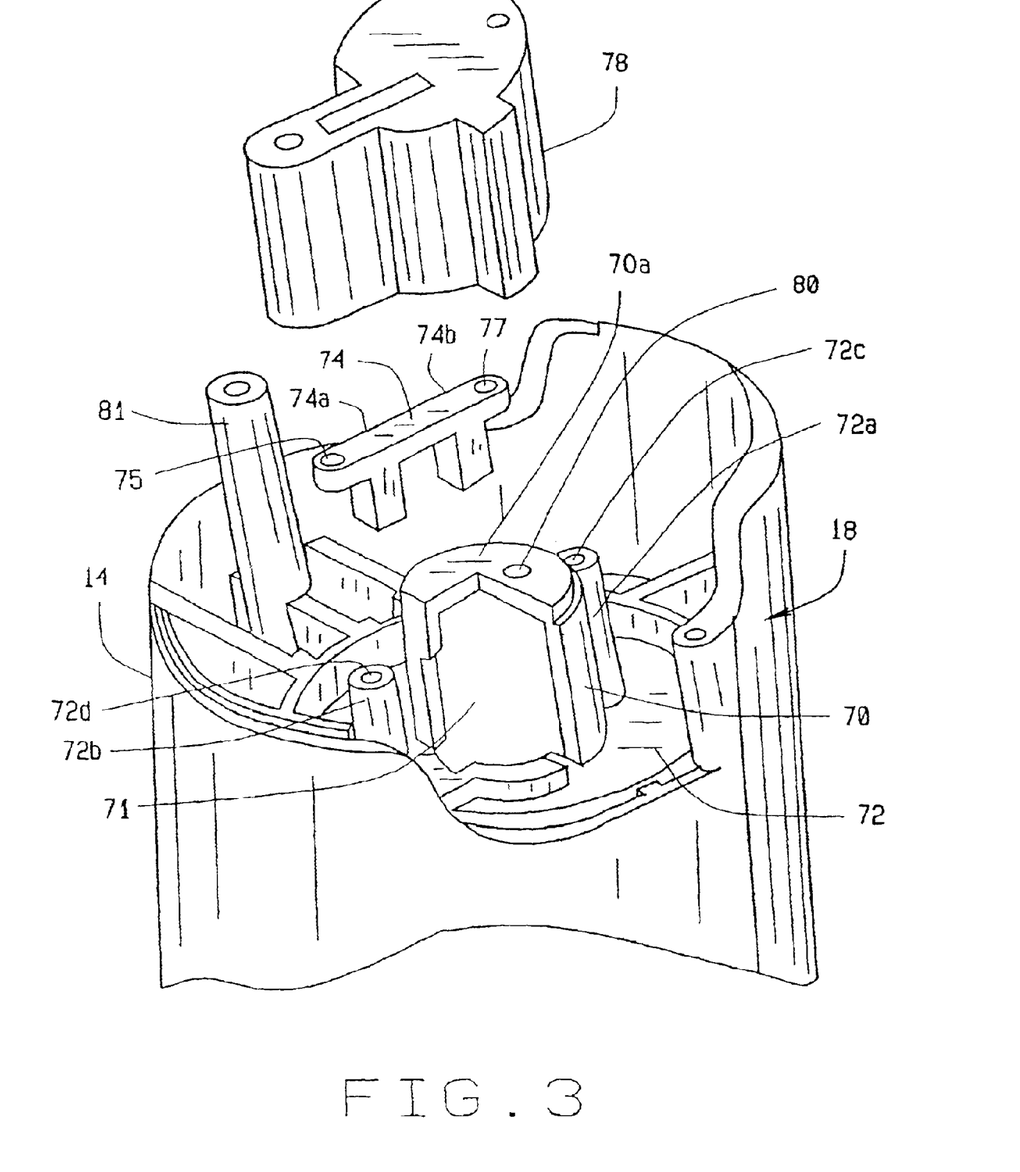
FIG. 3 is an exploded view of the interior of the distal end of the motor housing shown in FIG. 2.

FIG. 3 is an exploded view of the interior of the distal end of motor housing 14 (shown in FIG. 2). Behind the integral bearing support (not shown) of housing 14 is a bridge 70, which supports a position sensor 74. In the preferred embodiment, position sensor 74 comprises an optical sensor and is herein referred to optical sensor 74. However, it will be appreciated that position sensor 74 could be any other suitable position sensor, for example, a Hall Effect sensor. Bridge 70 is integrally formed with, and protrudes from, and an end wall 72 of housing 14. Optical sensor 74 is inserted under an upper portion 70a of the bridge 70 such that it fits substantially within a hollow area 71 inside the bridge. Optical sensor 74 includes tabs 74a and 74b, with tab 74a including an aperture 75 and tab 74b including an aperture 77. Optical sensor 74 is attached at tab 74b to the bridge 70 by a fastener (not shown), which extends through an aperture 80 formed in upper portion 70a of bridge 70 and through aperture 77. End wall 72 includes a pair of mounting bosses 72a and 72b projecting outwardly therefrom. Boss 72a includes a blind hole 72c and boss 72b includes a through hole 72d. Tab 74a of optical sensor 74 is laid over mounting boss 72b such that aperture 75 and through hole 72d are aligned.

Once fitted into bridge 70, as described above, optical sensor 74 is covered with a hollow plastic sensor cap 78. Optical sensor 74 is bounded above by cap 78 and below by second bearing 46, which form a sealed chamber for housing optical sensor 74. The sealed chamber protects optical sensor 74 from contamination by dirt, dust, oil and moisture, and accidental triggering by external light sources. Additionally, the distal end of motor housing 14 includes a boss 81 used in attaching vented end cap 22 (shown in FIG. 1) to the distal end of motor housing 14.

Optical sensor 74 interfaces with interrupter 66 (shown in FIG. 2) to provide data relating to rotor 34 position and speed. As shaft 50 and interrupter 66 rotate, the passing of vanes 66a of interrupter 66 is detected by optical sensor 74, which provides data to a main control PCB (described below in reference to FIG. 4). The main control PCB utilizes the data to determine information critical to proper operation of the motor 10, such as the relative position of rotor stack 58 to stator stack 30 (shown in FIG. 2) and the speed of rotor stack 58. Therefore, the alignment of interrupter vanes 66a to rotor poles 68 (shown in FIG. 2), and the alignment of stator stack 30 to optical sensor 74 is very important for proper motor operation.

Proper alignment of stator stack 30 to optical sensor 74 is accomplished by molding bridge 70 from the same core side of the mold as are stator locating ribs 40. Bridge 70 includes the sensor mounting structure, such as aperture 80 and mounting boss 72b, which precisely orient optical sensor 74 within bridge 70. Stator locating ribs 40 are keyed to stator stack channels 42 (shown in FIG. 2) such that stator stack 30 is fitted into housing 14 in a precise orientation. Therefore, the tooling that defines the sensor mounting features in bridge 70 also defines locating ribs 40. The fact that both bridge 70 and the stator locating ribs 40 are incorporated into the core side of the mold insures that these important structural components are integrally formed on the same part (i.e. housing 14). This serves to ensure that alignment of the optical sensor 74 relative to the position of stator stack 30 is controlled with great accuracy and further reduces the chance of misalignment of stator stack 30 during assembly of motor 10. It will also be appreciated this significantly reduces assembly time because particular care does not need to be taken in trying to manually align these components.

Figure 4:
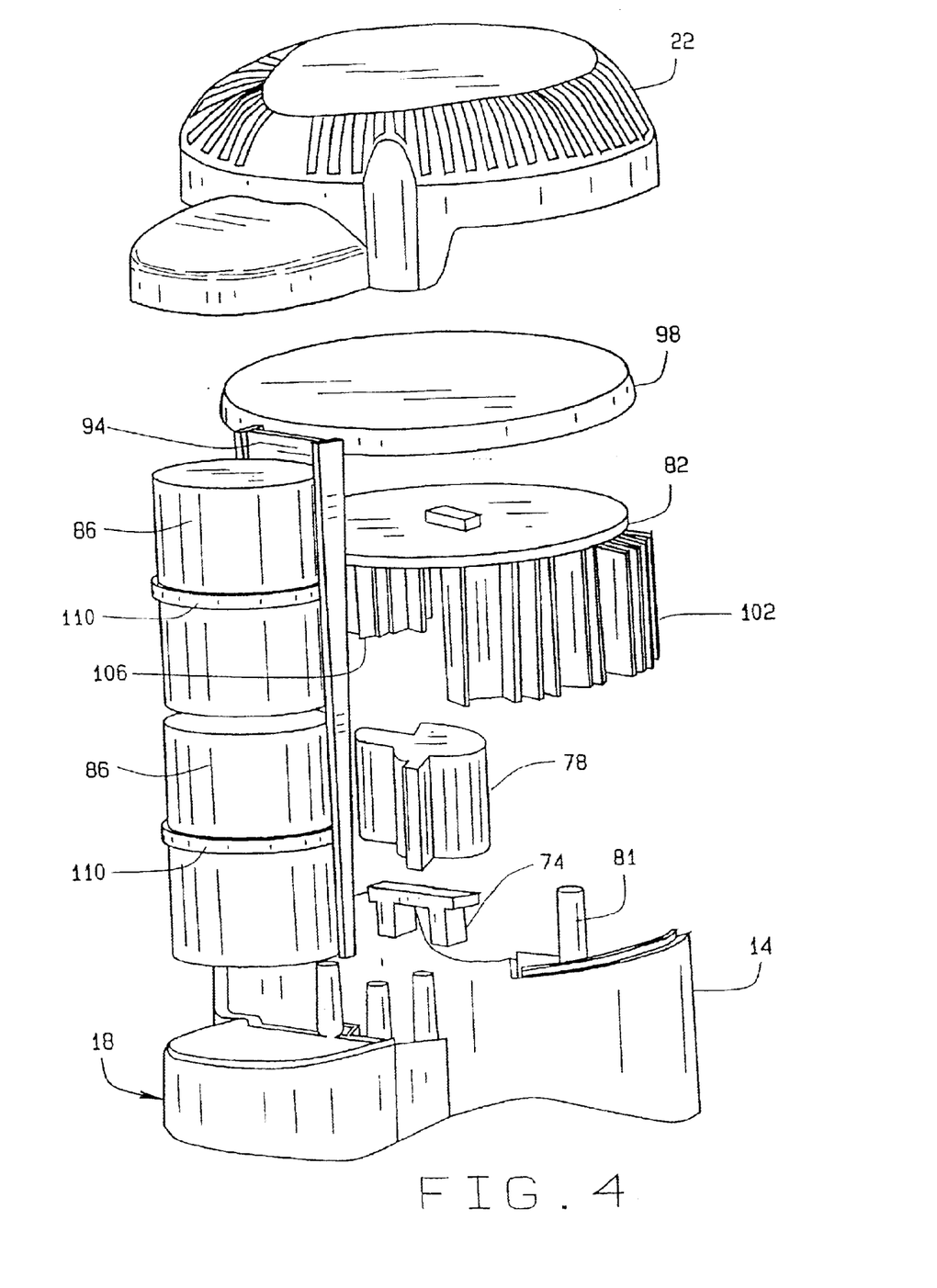
FIG. 4 is an exploded view of the distal end of the motor shown in FIG. 2, showing how the components at the distal end of the motor are assembled.

FIG. 4 is an exploded view of the distal end of motor 10 (shown in FIG. 2) showing how the components at the distal end of motor 10 are assembled. A main control PCB 82 fits behind optical sensor 74 while preferably a pair of capacitors 86, for example, large film capacitors, are mounted on a capacitor PCB 94 and housed in the bulge 18 integrated into the side of the motor housing 14.

Main control PCB 82 is potted in epoxy resin inside a plastic potting boat 98, which fits onto plastic boss 81 and another plastic boss (not shown) that extend up from motor housing 14. Additionally, main control PCB 82 has two wing-shaped aluminum heat sinks 102 and 106 fitted on opposite peripheral edges of main control PCB 82. Four switching devices, in one preferred form comprising insulated gated bipolar transistors (IGBTs), are secured to one of heat sinks 102 and 106, and also soldered to main control PCB 82. Additionally, four diodes are fitted to the other one of heat sinks 102 and 106. After all of components 74, 78, 82, 94 and 98 are inserted into housing 14, vented end cap 22 is placed over the components and secured to housing 14.

There are multiple connections (not shown) to main control PCB 82, which include the incoming AC power, connections to the motor leads, connections to optical sensor 74, and finally signal level leads coming from the various switches on the product, such as a trigger switch, a table position latch switch, or speed control potentiometers. These connections may be either directly soldered to main control PCB 82 and secured with potting compound or connected using terminals. All the external leads, such as AC power and signal level switch inputs, are bundled into a single, multi-conductor cable (not shown) which exits motor housing 14 on the side opposite bulge 18.

Figure 5:
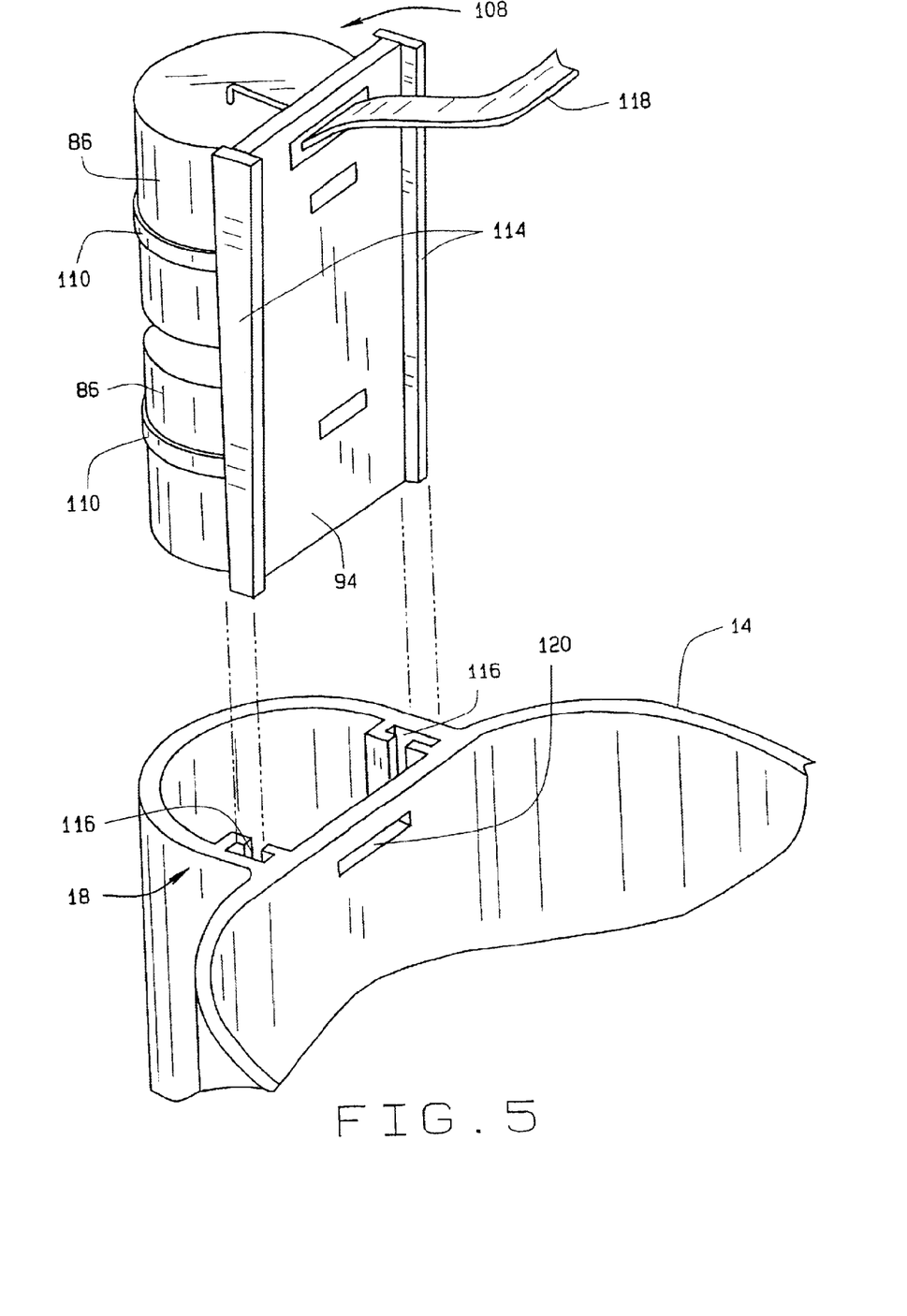
FIG. 5 is an exploded view of the housing shown in FIG. 4, showing how film capacitors are slideably inserted into a motor housing bulge.

FIG. 5 is an exploded view of motor housing 14 (shown in FIG. 4), showing how capacitors 86 are slideably inserted into motor housing bulge 18. In order to implement brushless motor 10 in applications where a typical universal motor is commonly utilized, the overall axial length of the motor must be similar to the axial length of typical universal motors.

In the preferred embodiment, motor housing 14 includes the integrally formed bulge 18, formed on a side of housing 14. The bulge 18 houses a capacitor assembly 108 thereby minimizing the overall axial length of motor 10. Capacitor assembly 108 includes capacitors 86, capacitor PCB 94, fasteners 110, and stiffeners 114. Capacitors 86 are soldered onto capacitor PCB 94 and then strapped to capacitor PCB 94 using fasteners 110, such as nylon cable ties. Stiffeners 114, which preferably comprise lengths of plastic each having a longitudinal groove, are attached to the two opposing longitudinal edges of capacitor PCB 94, thereby adding structural rigidity to capacitor PCB 94. In one embodiment, stiffeners 114 are temporarily attached to capacitor PCB 94, for example, using clips or a snap fitting. In an alternate embodiment, stiffeners 114 are permanently attached to capacitor PCB 94, for example, using glue or a bracket riveted to both capacitor PCB 94 and stiffeners 114. Stiffeners 114 fit into corresponding channels 116 along the inside wall of motor housing bulge 18. In the preferred embodiment, stiffeners 114 are drafted, and thus have a tapered shape.

Stiffeners 114 are slideably inserted into corresponding channels 116, which are also drafted, however the shape of stiffeners 114 and corresponding channels 116 are not so limited. End slots 117 (shown in FIG. 7) at the base of motor housing bulge 18 and in vented end cap 22 capture the ends of capacitor PCB 94. Capacitor PCB 94 is electrically connected to main control PCB 82 using flexible lead wires 118 inserted through an aperture 120 in the side wall of housing 14. Preferably lead wires 118 comprise a ribbon cable, but could be any other suitable electrical connecting means.

Figure 6:
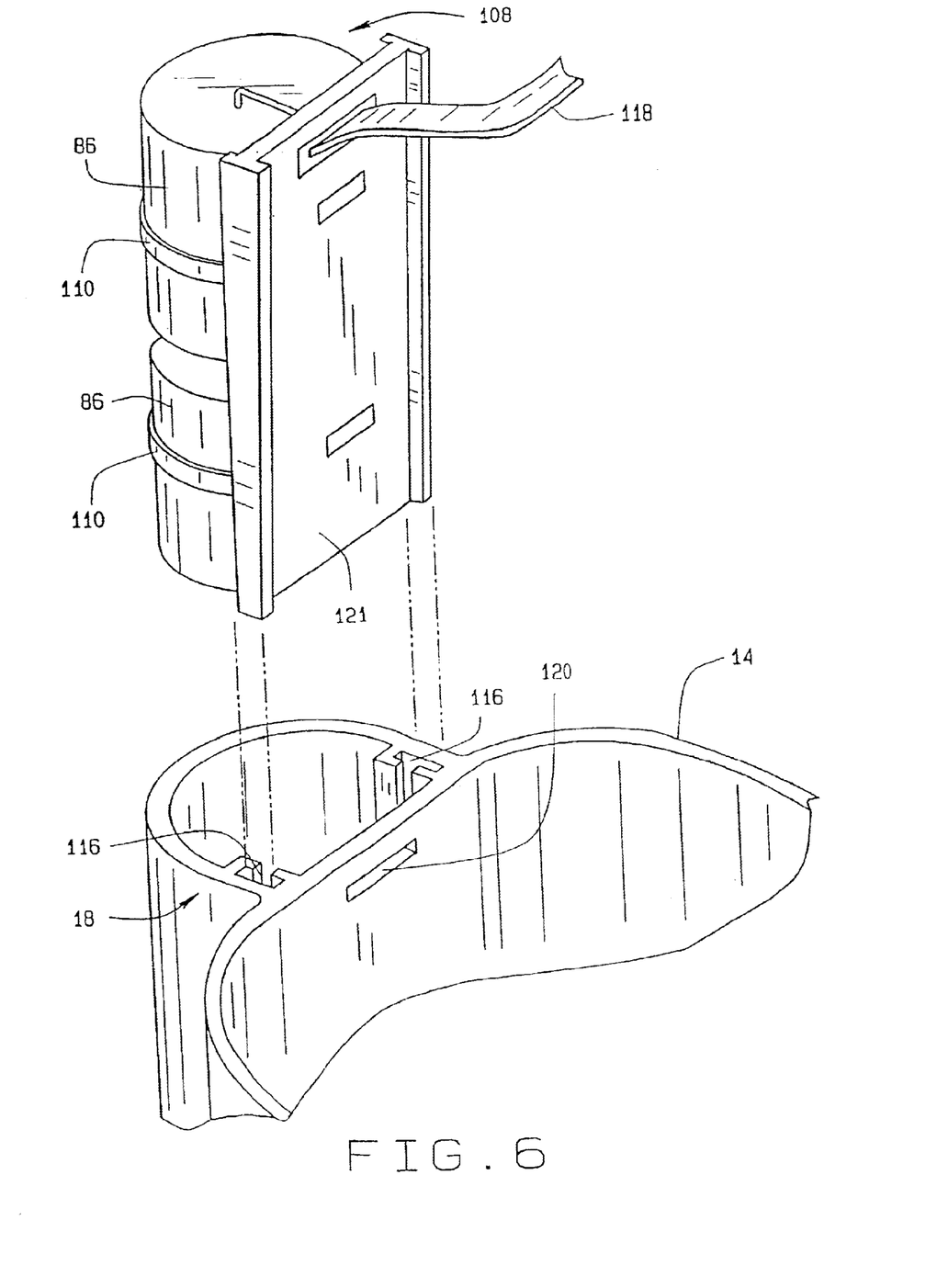
FIG. 6 is an alternate embodiment of the capacitor assembly shown in FIG. 5.

FIG. 6 is an alternate embodiment of capacitor assembly 108 (shown in FIG. 5) in which capacitor PCB 94 and stiffeners 114 are replaced by a carrier 121. In this embodiment circuitry for capacitors 86 is included on main control PCB 82 (shown in FIG. 4) and capacitors 86 are electrically connected to main control PCB 82 via flexible lead wires 118. Carrier 121 is made of any suitable material, i.e. plastic, and is shaped such that it has a flat surface on which capacitors 86 are attached, and a pair of longitudinal side rails that allow the capacitor assembly 108 to be slideably inserted into channels 116 in the same manner as stiffeners 114, described above in reference to FIG. 5. Alternatively, carrier 120 is shaped such that it has a flat surface with longitudinal edges which are slideably inserted into channels 116. Capacitors 86 are secured to carrier 121 in any suitable fashion. For example, capacitors 86 could have lugs screwed to bosses on carrier 121, or snap features that grip capacitors 86 could be molded into carrier 121, or capacitors 86 could be secured to carrier 119 using cable ties.

In an alternate embodiment, carrier 121 is dish shaped having a pair of longitudinal edges, or alternatively a pair of longitudinal side rails, that allow the capacitor assembly 108 to be slideably inserted into channels 116. Capacitors 86 are potted in epoxy resin inside dish shaped carrier 121 and electrically connected to capacitor circuitry on main control PCB 82 via flexible lead wires 118. In yet another embodiment, the circuitry for capacitors 86 is located on a PCB which is potted inside dish shaped carrier 121 along with capacitors 86 and connected to main control PCB 82 via flexible lead wires 118.

Figure 7:
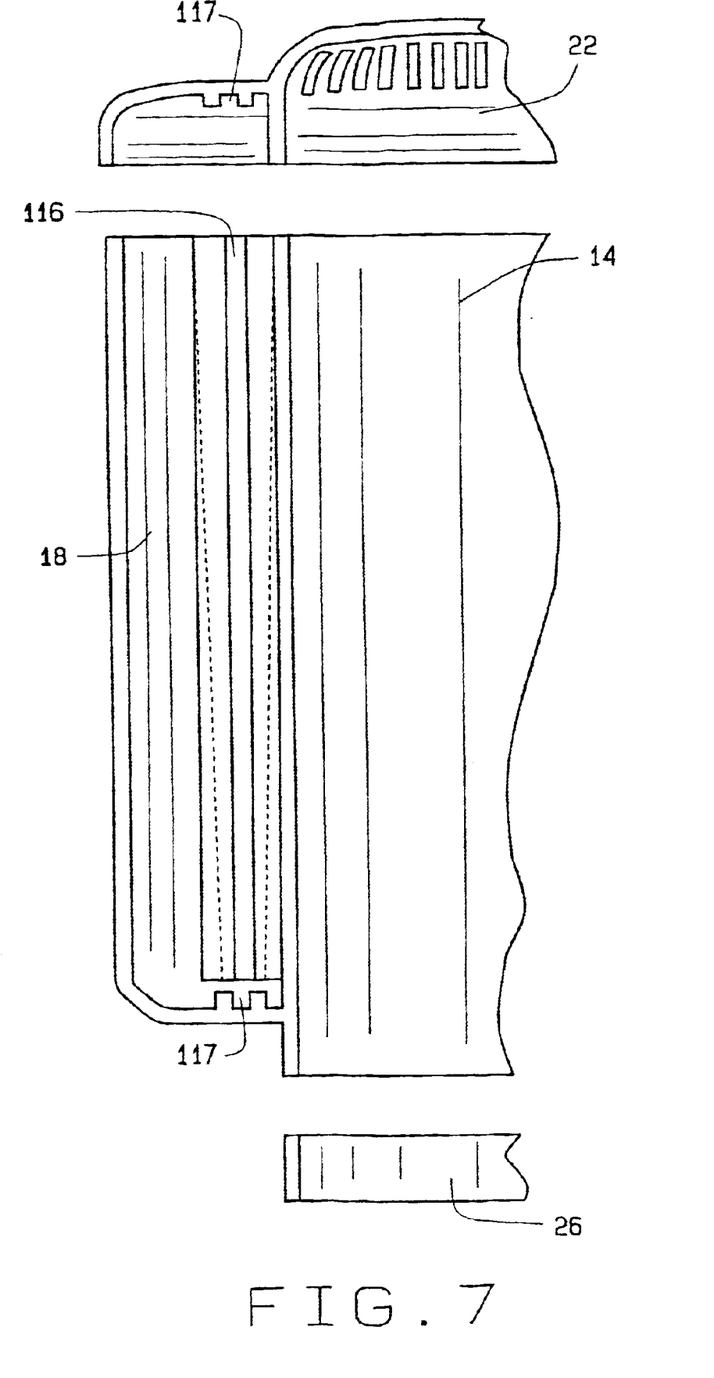
FIG. 7 is cross-sectional view of the motor housing bulge shown in FIG. 5.

FIG. 7 is cross-sectional view of bulge 18 (shown in FIG. 5) showing end slots 117 that capture the ends of PCB 94 when capacitor assembly 108 (shown in FIG. 5) is slidably inserted into bulge 18. As described above, end slots 117 are located at the base of motor housing bulge 18 and in vented end cap 22. When capacitor assembly 108 is completely inserted into of bulge 18 via channels 116 a leading edge of PCB 94 is captured in the end slot 117 located at the base of bulge 18. Additionally, when vented end cap 22 is coupled to housing 14 the end slot 117 located in end cap 22 captures a trailing edge of PCB 94. End slots 117 provide additionally rigidity to PCB 94 and stability to capacitor assembly 108 when motor 10 is assembled.

Figure 8:
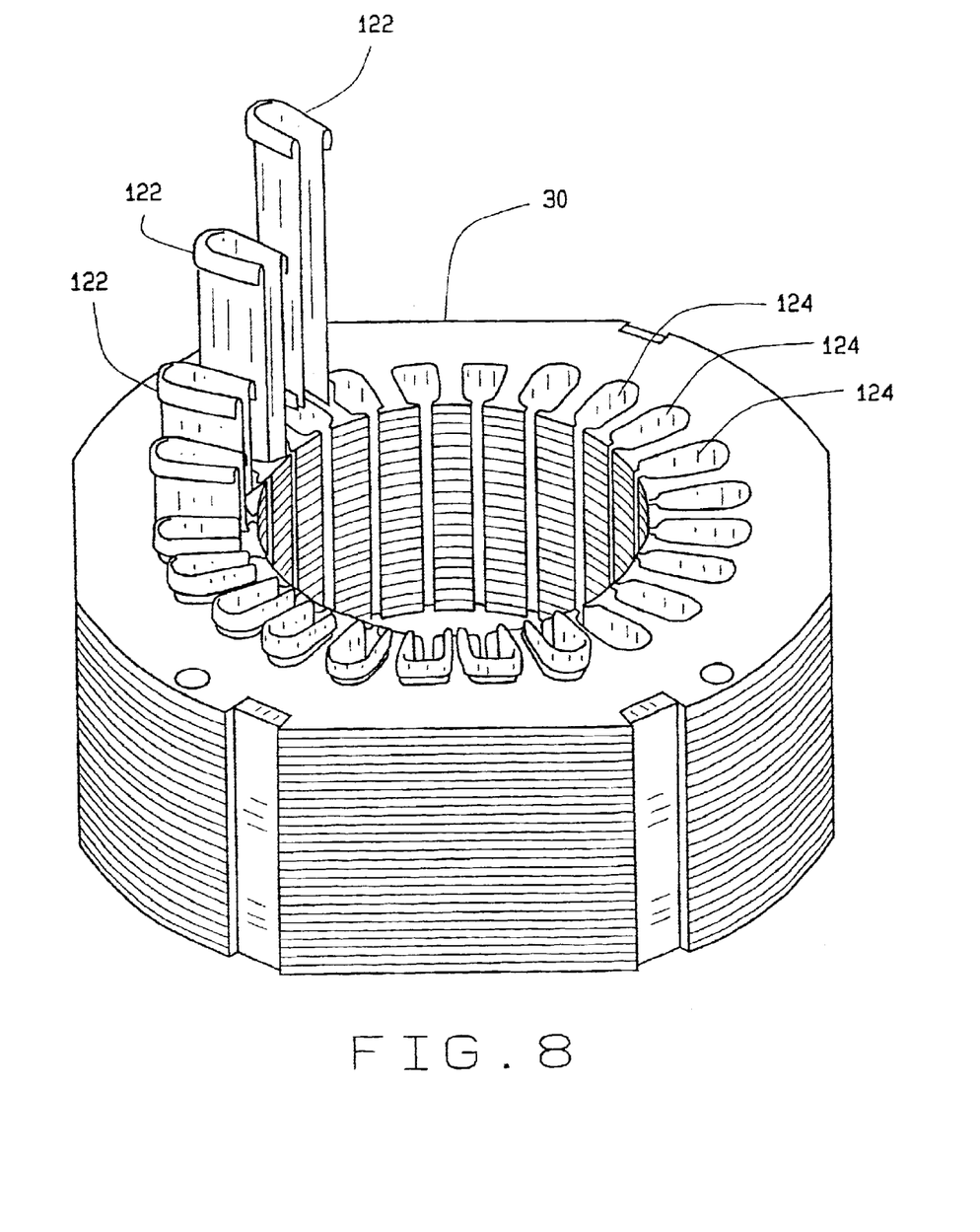
FIG. 8 is an exploded view of a stator stack shown in FIG. 2.

FIG. 8 is an exploded view of stator stack 30 (shown in FIG. 2). In the preferred embodiment stator stack 30 comprises a stack of laminations, known as a "unified stack", which are interlocked, welded, cleated, or bonded to one another. A plurality of first insulating strips 122 are formed into the shape of stator slots 124, inserted into stator slots 124 before windings or coils 126 are inserted into stator slots 124, and extend at either end of stator stack 30. A plurality of second insulating strips 128 (shown in FIG. 9), commonly known as "topsticks" or "coil stays", are wedged between windings 126 and the mouth of stator slots 124 after windings 126 are inserted into stator slots 124, and extend at either end of stator stack 30. First insulating strips 122 and second insulating strips 128 provide a layer of electrical insulation between current carrying components of motor 10 and metal parts of motor 10 that a user would normally come into contact with, referred to herein as "accessible metal". For example, if motor 10 is used in a hand held power saw, rotor shaft 50 is considered accessible metal because it connects through conducting a metal-to-metal interface with the saw gearbox, which connects through a conducting metal-to-metal interface to a saw blade.

Figure 9:
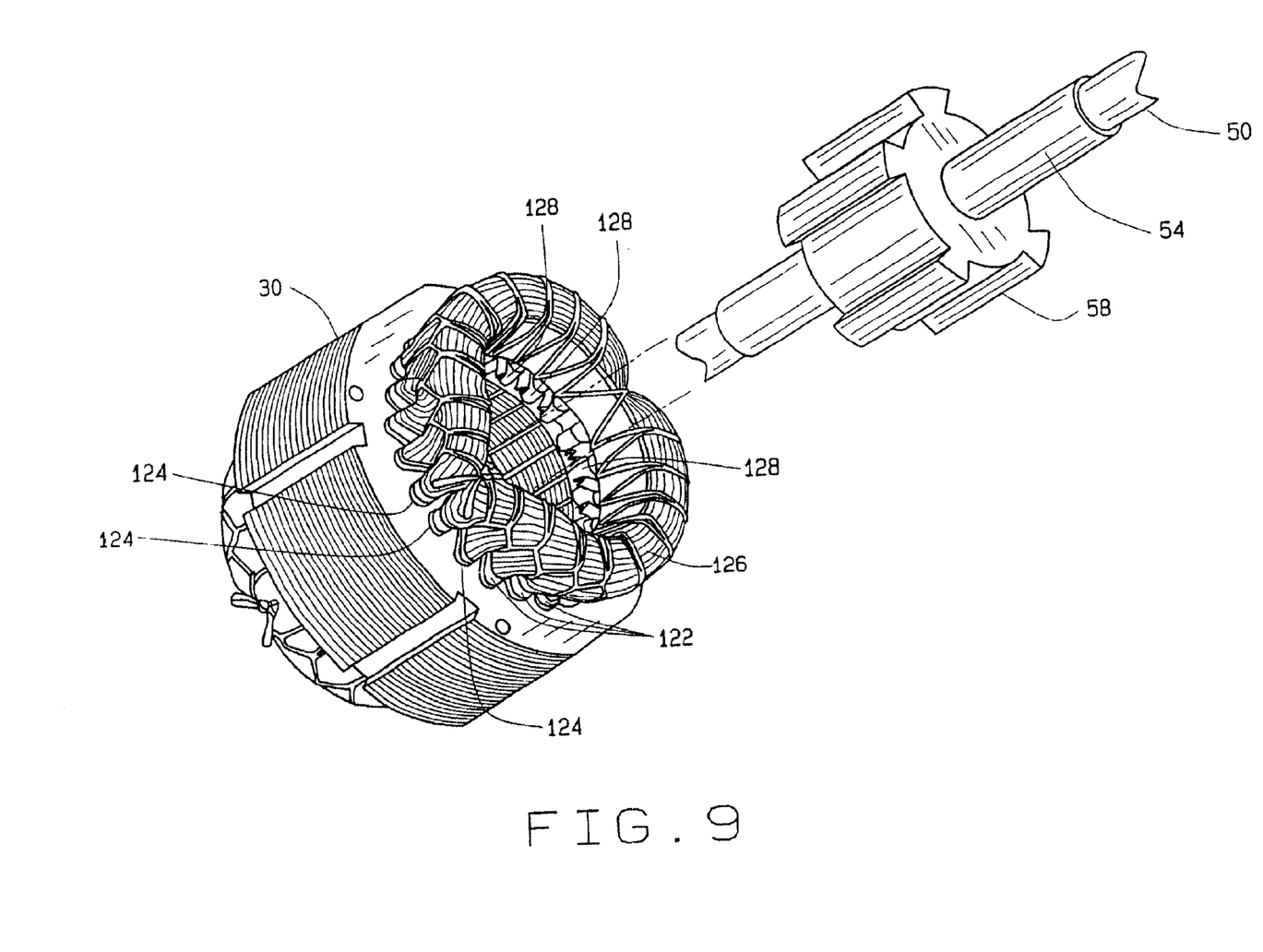
FIG. 9 is an exploded view of the stator and rotor assembly shown in FIG. 2.

FIG. 9 is an exploded view of stator stack 30 (shown in FIG. 8), rotor stack 58, and shaft 50 (shown in FIG. 2) showing a double insulation feature implemented in accordance with a preferred embodiment of motor 10 of present invention. Electronically commutated brushless motor 10 (shown in FIG. 2) includes two layers of electrical insulation between accessible metal and parts of motor 10 in which electrical current flows. One layer of insulation comprises insulation tube 54 between shaft 50 and rotor lamination stack 58. Insulation tube 54 is constructed of a non-conductive, electrically insulating material such as fiberglass. Insulation tube 54 is pressed onto shaft 50 and rotor lamination stack 58 is then pressed onto insulation tube 54.

Another layer of insulation comprises the plurality of first insulating strips 122 and the plurality of second insulating strips 128. First insulating strips 122 are constructed of an electrically insulating material and fit into stator slots 124 prior to stator windings 126, such that first insulating strips provide a first portion of an electrical barrier between stator windings 126 and stator laminations 30. Second insulating strips 128 are also constructed of an electrically insulating material and are fitted into stator slots 124 after windings 126, such that second insulating strips 128 provide a second portion of an electrical barrier between stator winding 126 and stator laminations 30. The combination of first insulating strips 122 and second insulating strips 128 totally encompass the part of stator winding 126 inserted into stator slots 124, thereby providing a complete electrical barrier between winding 126 and stator stack 30. The insulating material used to construct first insulating strips 122 and second insulating strips 128 can be any suitable insulating material, for example, Mylar®, or a laminated composite of Mylar® with other materials such as rag paper or Nomex®.

Thus, insulating tube 54 disposed between shaft 50 and rotor stack 58, and the combination of first insulating strips 122 and second insulating strips 128 disposed between stator stack 30 and windings 126, provide a double insulation barrier against possible electrical shock should a user come into contact with accessible metal if a malfunction has occurred in the motor that would otherwise cause electrical current to be in contact with accessible metal portion of the tool.

In an alternate embodiment housing 14 is constructed of a non-conductive material, thereby providing a supplemental layer of insulation within motor 10, in addition to the double insulation barrier described above. In another alternate embodiment, stator stack 30 is installed into motor housing using a non-conductive intermediate device, such as a molded plastic cradle, housing, or sleeve (not shown) into which stator stack 30 is inserted prior to being installed in housing 14. In this embodiment the plastic cradle would house stator stack 30 and would then fit into housing 14 thereby providing an alternate supplemental layer of insulation between parts of motor 10 in which electrical current flows and accessible metal.

Figure 10:
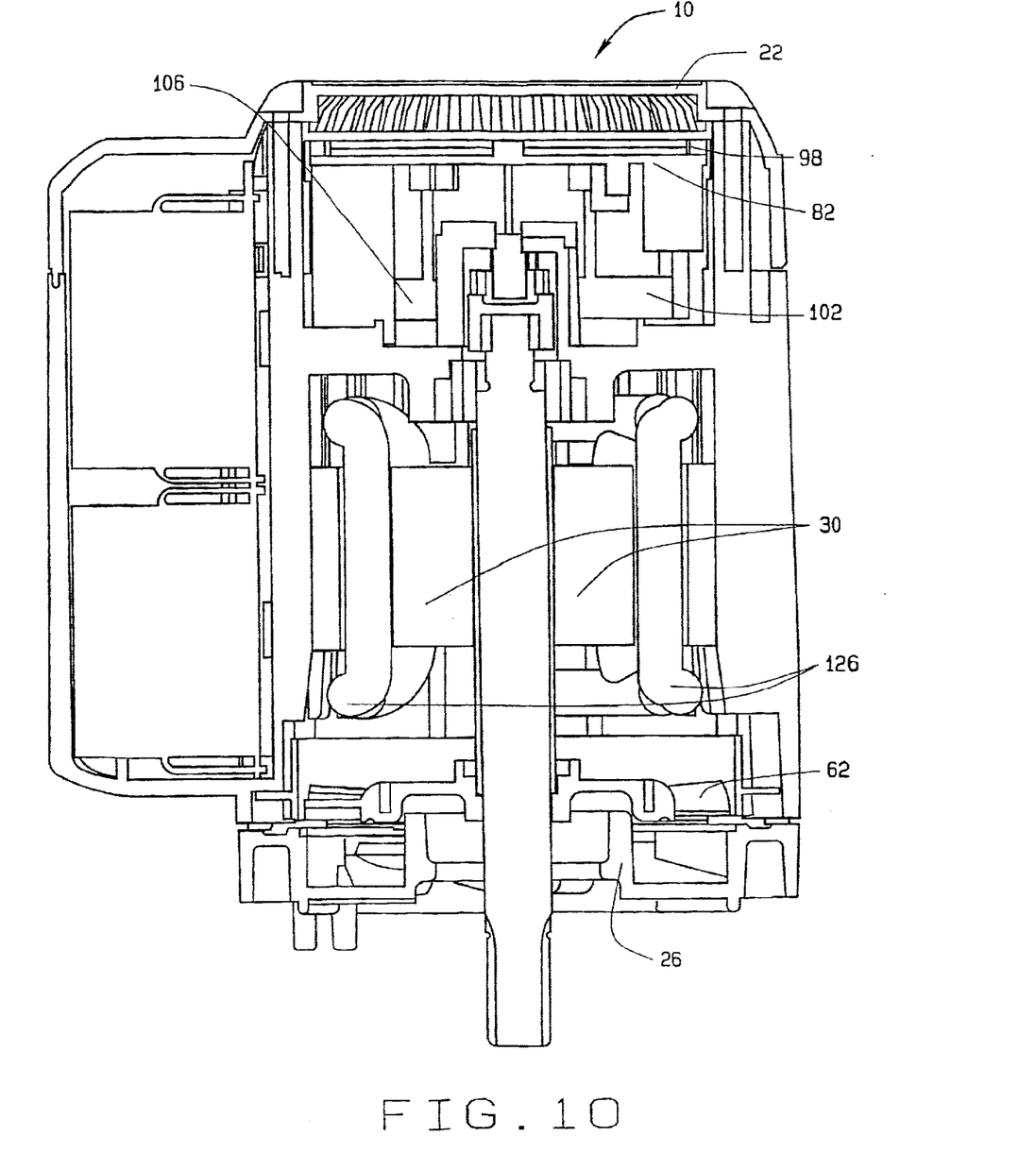
FIG. 10 is cross-sectional view of the motor shown in FIG. 1.

FIG. 10 is cross-sectional view of motor 10 (shown in FIG. 2). In the electronically commutated brushless motor 10, air is drawn in through vented end cap 22, passes around the periphery of potting boat 98 and main control PCB 82, through channels created by extruded fins of aluminum heat sinks 102 and 106, continues over stator windings 126, passes through and around stator stack 30, through cooling fan 62, and exhausts out bearing end cap 26.

Potting boat 98 and main PCB 82 impede this airflow by causing an obstruction to a more direct flow of air into heat sinks 102 and 106. The obstruction to airflow is further compounded by the molding process of housing 14. To effectively mold and produce housing 14, it must have draft added on both its internal core and external cavity sides of the mold. The draft closes the space between an internal wall of housing 14 and potting boat 98, thereby further restricting the airflow around through the motor.

Figure 11:
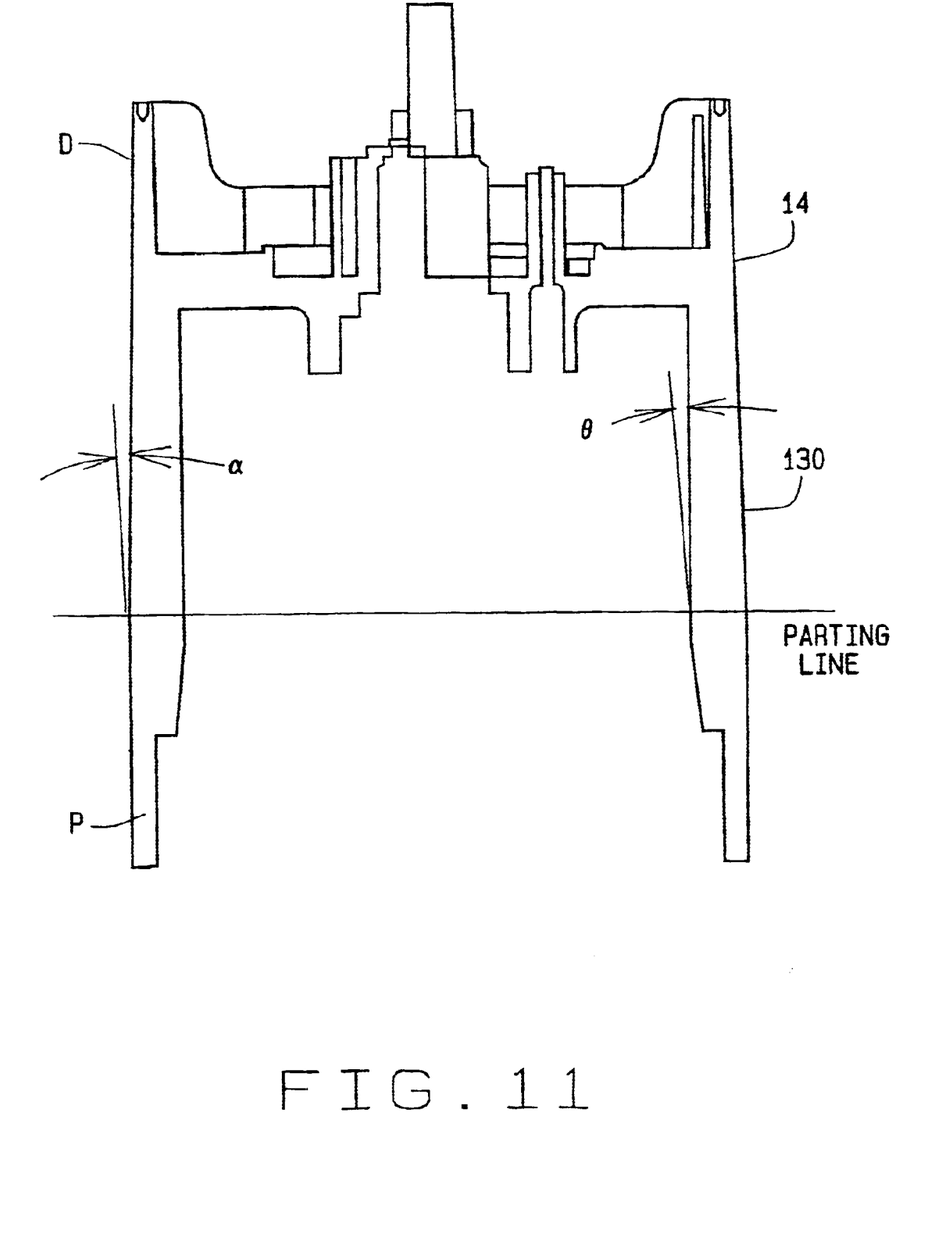
FIG. 11 is a schematic of the housing of the motor shown in Figure, showing the location of the parting line of the core and cavity used to mold the housing.

FIG. 11 is a schematic of the housing 14 (shown in FIG. 2), showing the location of the parting line of the core and cavity used to mold housing 14. Housing 14 is designed to provide more area at the distal end, or rear, of housing 14 than known electronically commutated brushless motor housings. The increased area provides greater space around potting boat 98 (shown in FIG. 4), which allows improved airflow through the motor 10 (shown in FIG. 1).

Generally, when designing molding tools for a motor housing, such as motor housing 14, a specified angle of draft θ in the core, and a specified angle of draft α in the cavity, are designed into the molding tools to make removal of the housing from the mold easier. The draft incorporated into the core and cavity create taper in the sidewall of the housing that extends away from a parting line between the core and cavity. Specifically, draft angle α in the cavity creates taper in an exterior surface of the housing.

The interfacing surface at which the core and cavity meet, and separate, during the molding process is referred to as the parting line. Draft angles θ and α are measured from a plane perpendicular to the parting line. Since draft angle α creates taper in the exterior surface, the further the parting line is away from the distal end of the housing, or the closer the parting line is to the proximal end, the smaller the outside diameter of the distal end of the housing will be. The inside diameter of the distal end of the housing directly relates to the outside diameter. Thus, the further away the parting line is from the distal end of the housing, the smaller the inside diameter of the distal end will be, thereby providing less area for air to flow in the distal end of the housing.

Referring to FIG. 11, the parting line of housing 14 is shown located closer to the distal end "D" of housing 14, rather than at, or near, the proximal end "P" of housing 14, as is generally the case in known motor housings. Having the parting line located closer to the distal end D of housing 14 reduces the amount of taper of exterior surface 130, and therefore provides an increased outside diameter of the distal end, which in turn provides an increased inside diameter of the distal end of housing 14. The increased inside diameter increases the area at the distal end, thereby providing more room for air to flow around potting boat 98 (shown in FIG. 4).

Therefore, electronically commutated brushless motor 10 provides a modular motor that fits the existing mounting schemes for typical universal motors. Motor 10 includes a housing having a bulge wherein two large capacitors are placed, thereby providing a brushless motor having an overall axial length comparable to typical universal motors. Additionally, proper alignment of the position sensor to the stator is achieved by molding the mounting features for both the position sensor and the stator using the same molding core. Furthermore, motor 10 implements a double insulation design in an electronically commutated brushless motor. Even further, the design of motor 10 provides improved airflow through the motor by moving the parting line of the molding core and cavity, thereby permitting the housing to be molded using less taper, which in turn allows more space for air to flow around the electronics control module of the motor.

While the invention has been described in terms of various specific embodiments, those skilled in the art will recognize that the invention can be practiced with modification within the spirit and scope of the claims.

What is claimed is:

1. An electronically commutated brushless motor comprising:

a motor housing defining a cavity which is configured to at least partially receive a rotor, the motor housing including an integrally formed sidewall having a bulge therein, the bulge defining a hollow area that is offset from the cavity, the hollow area being bounded by the sidewall in a direction radially outwardly of the cavity; and a capacitor assembly including a printed circuit board and at least one capacitor, said capacitor assembly housed in said bulge and electronically controlling commutation of the electronically commutated brushless motor.

2. The motor of claim 1 wherein said capacitor assembly is slideably inserted into said bulge.

3. The motor of claim 1 wherein said bulge comprises a plurality of channels located along an inside surface of a sidewall of said bulge.

4. The motor of claim 3 wherein said capacitor assembly comprises:

a capacitor printed circuit board (PCB) comprising a plurality of longitudinal edges; and at least one capacitor mounted on said capacitor PCB.

5. The motor of claim 4 wherein said longitudinal edges of said capacitor PCB are slideably inserted in said channels.

6. The motor of claim 4 wherein said capacitor assembly further comprises a plurality of stiffeners, one of said stiffeners being attached to each of said longitudinal edges of said capacitor PCB, and said stiffeners being slideably inserted in said channels.

7. The motor of claim 6 wherein said stiffeners have a tapered shape, and said channels have correspondingly tapered shape.

8. A method for constructing an electronically commutated brushless motor, said method comprising:
  forming a motor housing with a cavity that is configured to at least partially receive a rotor, the motor housing including an integrally formed sidewall having a bulge therein, the bulge defining a hollow area that is offset from the cavity, the hollow area being bounded by the sidewall in a direction radially outwardly of the cavity;
  providing a capacitor assembly; and
  slideably inserting the capacitor assembly into the bulge.

9. The method of claim 8 wherein providing a capacitor assembly comprises:
  providing a capacitor printed circuit board (PCB) having a plurality of longitudinal edges; and
  mounting at least one capacitor on the capacitor PCB.

10. The method of claim 9, wherein the motor housing includes a pair of capacitor assembly engagement features that are formed on an inside surface of the sidewall proximate the bulge, wherein the capacitor PCB includes a pair of longitudinal edges and wherein the step of slideably inserting the capacitor assembly includes engaging the longitudinal edges of the capacitor PCB to the capacitor assembly engagement features.

11. The method of claim 8 wherein providing a capacitor assembly comprises:
  providing a capacitor PCB having a plurality of longitudinal edges;
  mounting at least one capacitor on the capacitor PCB; and
  attaching a stiffener to each longitudinal edge.

12. The method of claim 11, wherein the motor housing includes a pair of capacitor assembly engagement features that are formed on an inside surface of the sidewall proximate the bulge and wherein the step of slideably inserting the capacitor assembly includes engaging the longitudinal edges of the capacitor PCB to the capacitor assembly engagement features.

13. The method of claim 11 wherein attaching a stiffener comprises attaching a drafted stiffener having a tapered shape to each longitudinal edge.

14. The method of claim 13, wherein the motor housing includes a pair of capacitor assembly engagement features that are formed on an inside surface of the sidewall proximate the bulge, the engagement features having a tapered shape corresponding to the tapered shape of the drafted stiffeners, and wherein the step of slideably inserting the capacitor assembly includes engaging the longitudinal edges of the capacitor POB to the capacitor assembly engagement features.

15. An electronically commutated brushless motor comprising:
  a motor housing with a cavity that is configured to at least partially receive a rotor, the motor housing including an integrally formed sidewall and a plurality of capacitor assembly engagement features, the sidewall having a bulge therein, the bulge defining a hollow area that is offset from the cavity, the hollow area being bounded by the sidewall in a direction radially outwardly of the cavity, the capacitor assembly engagement features being integrally formed with the sidewall and being located in a vicinity of the bulge; and
  a capacitor assembly slideably inserted in said bulge and engaging the capacitor assembly engagement features.

16. The motor of claim 15 wherein said capacitor assembly comprises:
  a capacitor printed circuit board (PCB) comprising a plurality of longitudinal edges, said longitudinal edges slideably inserted in said channels: and
  at least one capacitor mounted on said capacitor PCB.

17. The motor of claim 15 wherein said capacitor assembly comprises:
  a capacitor PCB comprising a plurality of longitudinal edges,
  at least one capacitor mounted on said capacitor PCB; and
  a stiffener attached to each of said longitudinal edges of said capacitor PCB, said stiffeners slideably inserted in said channels.

18. The motor of claim 15 wherein said capacitor assembly comprises:
  a capacitor PCB comprising a plurality of longitudinal edges,
  at least one capacitor mounted on said capacitor PCB; and
  a drafted stiffener having a tapered shape attached to each of said longitudinal edges of said capacitor PCB.

19. The motor of claim 18 wherein said channels have a tapered shape corresponding to the tapered shape of said drafted stiffeners, and wherein said drafted stiffeners are slideably inserted in said tapered channels.

20. The method of claim 10, wherein the capacitor assembly engagement features are channels that are integrally formed with the sidewall.

21. The method of claim 12, wherein the capacitor assembly engagement features are channels that are integrally formed with the sidewall.

22. The method of claim 14, wherein the capacitor assembly engagement features are channels that are integrally formed with the sidewall.

23. The motor of claim 15, wherein said capacitor assembly includes a capacitor printed circuit board (PCB) with a pair of laterally spaced-apart longitudinal edges and wherein the capacitor assembly engagement features engage the longitudinal edges of the capacitor PCB.

24. The motor of claim 15, wherein said capacitor assembly includes a capacitor printed circuit board (PCB) and plurality of stiffeners, each of the stiffeners being coupled to one of the opposite longitudinal edges of the capacitor PCB and wherein the capacitor assembly engagement features include a pair of channels that slideably receive the stiffeners.

25. The motor of claim 24, wherein the stiffeners include a leading portion and a trailing portion, the leading portion being configured to be inserted into the motor housing before the trailing portion, the leading portion being smaller than the trailing portion so as to provide at least a portion of the stiffeners with a tapered shape.

26. The motor of claim 25, wherein the channels are tapered in a manner that conforms to the tapered shape of the stiffeners.

27. An electronically commutated brushless motor comprising:
  a motor housing having a sidewall;
  a bulge integrally formed in a sidewall of said motor housing; and
  a capacitor assembly including a printed circuit board and at least one capacitor, said capacitor assembly housed entirely in said bulge and adapted to be slideably inserted into said bulge along a path extending generally parallel to a central longitudinal axis of said housing.

28. The electronically commutated brushless motor of claim 27, wherein a pair channels are formed into the sidewall adjacent the bulge.

29. The electronically commutated brushless motor of claim 28, wherein the capacitor assembly includes a capacitor printed circuit board, and wherein the channels are configured to engage opposite lateral sides of the capacitor printed circuit board.

30. The electronically commutated brushless motor of claim 29, wherein the capacitor assembly includes a pair of stiffeners for supporting the capacitor printed circuit board and wherein the stiffeners are also received into the channels.

31. The electronically commutated brushless motor of claim 30, wherein at least a portion of each stiffener has a tapered shape.

32. The electronically commutated brushless motor of claim 31, wherein at least a portion of each channel is tapered in a manner that corresponds to the tapered shape of the stiffeners.

33. The electronically commutated brushless motor of claim 28, wherein the capacitor assembly includes a pair of stiffeners for supporting the capacitor printed circuit board and wherein the stiffeners are received into the channels.

34. The electronically commutated brushless motor of claim 33, wherein at least a portion of each stiffener has a tapered shape.

35. The electronically commutated brushless motor of claim 34, wherein at least a portion of each channel is tapered in a manner that corresponds to the tapered shape of the stiffeners.

36. An electronically commutated brushless motor comprising:

a motor housing having a cavity which is shaped to at least partially receive a rotor, the motor housing including an integrally formed sidewall having a bulge therein, the bulge defining a hollow area offset from the cavity;

a capacitor assembly including a printed circuit board and at least one capacitor, said capacitor assembly being slidably insertable entirely into said hollow area of said bulge and electronically controlling commutation of the electronically commutated brushless; and wherein said capacitor assembly is substantially entirely encapsulated within said bulge.

37. An electronically commutated brushless motor comprising:

a motor housing having a cavity which is shaped to at least partially receive a rotor, the motor housing including an integrally formed sidewall having a bulge therein, the bulge defining a hollow pocket offset from the cavity and with an opening within a plane generally perpendicular to said sidewall; and a capacitor assembly including a printed circuit board and at least one capacitor for electronically commutating said motor;

said capacitor assembly being entirely positionable within said hollow pocket through said opening so as to be encapsulated within said hollow packet generally parallel to said sidewall.

* * * * *

UNITED STATES PATENT AND TRADEMARK OFFICE
CERTIFICATE OF CORRECTION

PATENT NO. : 6,720,689 B2
DATED : April 13, 2004
INVENTOR(S) : Michael J. Agnes et al.

It is certified that error appears in the above-identified patent and that said Letters Patent is hereby corrected as shown below:

Column 11,
Line 45, "POB" should be -- PCB --.

Column 12,
Line 63, after "pair" insert -- of --.

Column 14,
Line 8, after "brushless" insert -- motor --.
Line 26, "packet" should be -- pocket --.

Signed and Sealed this

Sixteenth Day of November, 2004

JON W. DUDAS
*Director of the United States Patent and Trademark Office*